Feb. 4, 1964 J. R. NOWELL 3,120,620

PULSE CIRCUIT

Filed June 7, 1962

INVENTOR:
JOHN R NOWELL
BY: William C. Cahill
ATTORNEY:

3,120,620
PULSE CIRCUIT
John R. Nowell, Phoenix, Ariz., assignor to General Electric Company, a corporation of New York
Filed June 7, 1962, Ser. No. 200,881
16 Claims. (Cl. 307—88.5)

The present invention pertains to pulse circuits, and more specifically, to circuits utilizing silicon controlled rectifiers for the production of electrical pulses.

Since the introduction of silicon controlled rectifiers, these devices have found use in the replacement of power transistors, vacuum tubes, thyratrons, relays, saturable reactors, and many other electrical devices.

The utilization of silicon controlled rectifiers presents unique problems which previously may not have been encountered in non-silicon controlled rectifier circuits. On problem which presents itself with the use of silicon controlled rectifiers (SCR) is the necessity for the application of a reverse voltage to the SCR to rapidly turn the SCR off once it has started to conduct. Many solutions have been proposed to this problem; however, the circuits proposed thus far have not provided for the automatic switching of an SCR to produce a pulse of a given duration after the SCR has been gated to its high-conduction region.

Accordingly, it is an object of the present invention to provide an improved pulse circuit.

It is also an object of the present invention to provide a means for reversing the voltage on a silicon controlled rectifier at a predetermined time after the silicon controlled rectifier has been gated.

It is another object of the present invention to provide a pulse circuit utilizing silicon controlled rectifiers.

It is still another object of the present invention to automatically gate a silicon controlled rectifier when the voltage between the anode and gate electrodes of the silicon controlled rectifier exceeds a predetermined value.

Further objects and advantages of the present invention will become apparent to those skilled in the art as the description thereof proceeds.

Briefly stated, in accordance with one aspect of the present invention, a pulse circuit is provided utilizing an SCR in series with a power supply and an electrical load. The SCR may be gated to its conducting state by any convenient means such as, for example, a transformer secondary connected to the gate electrode of the SCR. The primary of the transformer may be connected to a switching circuit for providing gating pulses to the gate electrode. When the SCR is conducting, and after a predetermined time, a reverse voltage is impressed on the SCR to cause it to cease conducting. The reverse voltage is impressed by the combination of a resistance-capacitance circuit and a second SCR. The second SCR is gated to the conducting state by a voltage-sensing means, such as a zener diode, coupled from the anode electrode to the gate electrode of the second SCR.

The invention, both as to its organization and operation, together with further objects and advantages thereof may best be understood by reference to the following description taken in connection with the accompanying drawings in which.

Figure 1:
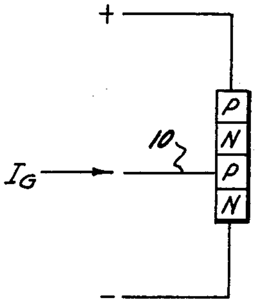
FIG. 1 is a schematic illustration of a typical silicon controlled rectifier.

Referring to FIG. 1, a schematic illustration of an SCR is shown. An SCR may be considered a three-junction semiconducting device comprising four semiconductor elements of alternating types joined to form a PN, an NP, and a PN junction respectively. The SCR may therefore be analyzed by considering the properties of PN junctions. The two PN junctions readily conduct current in the forward direction as indicated by the positive and negative sign on the connecting conductors; the NP junction acts as a reverse-biased junction which inhibits current until a certain threshold voltage has been reached, at which time the junction readily conducts current. The voltage at which this threshold occurs may be controlled by the utilization of a gating electrode 10 which, when utilized to apply a positive bias to the NP junction, reduces the threshold voltage, therefore enabling the SCR to be "gated" to its conducting stated without the necessity of applying the full threshold voltage to the device.

Figure 2:
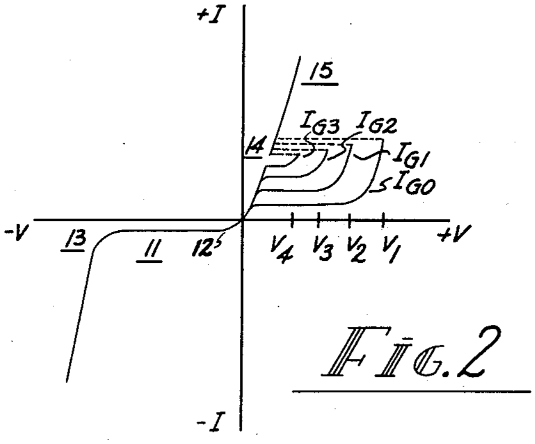
FIG. 2 is a curve showing representative voltage-current characteristics of a typical silicon controlled rectifier.

Referring to FIG. 2, representative voltage-current characteristics of an SCR are shown. In the reverse bias, or negative voltage region 11 of the curve 12, it may be noted that very little negative current will pass through the SCR. When the reverse bias voltage reaches the knee of the curve 12, the reverse-biased PN junctions experience what is called the "avalanche breakdown" and immediately conduct.

In the forward-biased region 14 of the curve 12, the voltage at which the SCR readily conducts current, or enters into the high-conduction region 15, depends on the current injected into the SCR in gate conductor 10 (FIG. 1). It may be seen from an inspection of the curve of FIG. 2, that when no gate current is flowing $I_{G0}$, an increase of forward voltage on the SCR provides relatively little increase in current flowing therethrough. This condition exists until a breakdown voltage $V_1$ is obtained, at which time the current increases rapidly and the forward resistance of the SCR is greatly reduced, thus providing extremely high conductivity in the forward direction and placing the conduction in region 15 of the curve 12. With a gate current flowing $I_{G1}$, the breakdown voltage occurs sooner; viz., $V_2$. With increasing gate current, the breakdown voltage occurs at decreasing values of forward bias until, as illustrated by the gate current $I_{G3}$ and voltage $V_4$, the breakdown voltage is only slightly greater than the minimum voltage needed for maintaining forward conduction after the SCR has been gated on.

Accordingly, an SCR may be placed in the circuit with a forward bias, and a gating current can be injected into the gate electrode to cause the SCR to conduct. However, when the SCR is to be utilized in a pulse circuit, and it is necessary to rapidly turn the SCR off, a reverse voltage must be impressed on the SCR to return it to its non-conducting state.

Figure 3:
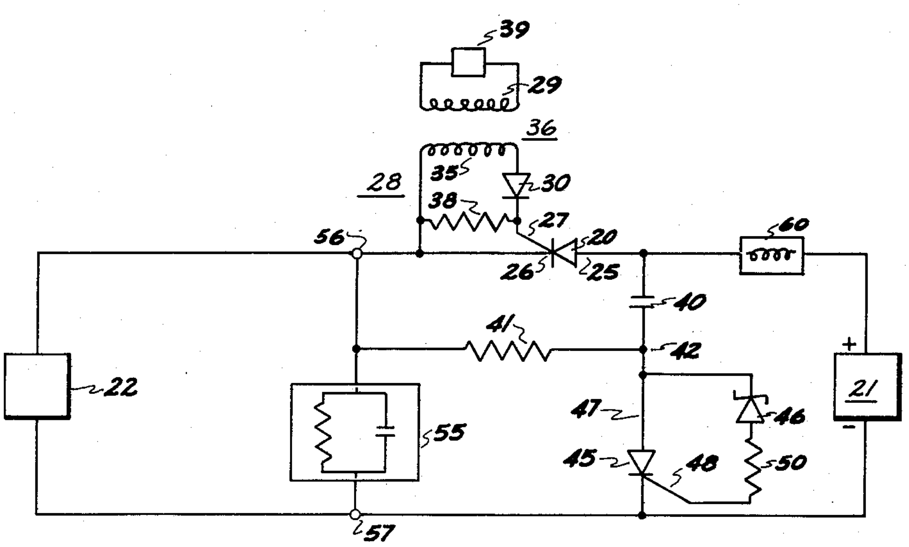
FIG. 3 is a circuit diagram of a pulse circuit constructed in accordance with the teachings of the present invention.

Referring to FIG. 3, a pulse circuit constructed in accordance with the teachings of the present invention is shown utilizing a SCR to produce the desired pulse. A SCR 20 is connected in series with a voltage source 21 and a load 22. The SCR 20 is connected to the voltage source at anode electrode 25, and to the load 22 at the cathode electrode 26. The gate electrode 27 is connected to a gating circuit indicated generally at 28. This gating circuit 28 comprises a diode 30 poled to permit current to flow to the gate electrode and to prohibit reverse current from flowing from the gate electrode. The anode of the diode 30 is connected to the secondary winding 35 of a transformer 36. The other side of the secondary winding 35 is connected to the load side of the SCR 20. A shunt resistor 38 is provided between the cathode of the diode 30 and the opposite side of the secondary winding 35. The primary winding 29 of the transformer 36 may be connected to any convenient switching circuit, illustrated generally at 39, and may be any manual or automatic switching circuit for producing current to gate the SCR 20.

A capacitor 40 and a resistor 41 are connected in series across the anode-cathode electrodes of the SCR 20. A second SCR 45 is connected to the junction 42 between the capacitor 40 and resistor 41 and the negative side of the voltage source 21. The second SCR 45 is poled to permit current to flow from the junction 42 to the voltage source 21. A voltage-sensing device, shown in FIG. 3 as zener diode 46, is provided for sensing the voltage between the anode electrode 47 and the gate electrode 48 of the SCR 45. A series resistor 50 may be included with the voltage-sensing device 46 as a protective measure.

The load 22 may comprise an impedance having sufficient time delay characteristics to render it unnecessary to provide further circuit components to decrease the rate of change of the voltage existing at pulse circuit output terminals 56 and 57. However, if the load 22 is primarily resistive, and only slightly reactive, it may be necessary to add a delay network 55 for decreasing the rate of change of the voltage across terminals 56 and 57. The purpose of desiring to resist rapid changes in the voltage at the output terminals 56 and 57 will become apparent during the discussion of operation. The network 55 may comprise any convenient delay network such as, for example, a parallel RC circuit.

To aid in the development of a reverse voltage on the SCR 20, it may be convenient to insert a small impedance element 60 between the anode electrode 25 of the SCR 20 and the positive terminal of the voltage source 21. The impedance element 60 may not be necessary; however, the development of a negative voltage may be aided by the inclusion of this added impedance since it may serve to isolate the voltage source from very rapid voltage changes that may occur at the anode electrode 25 of the SCR 20. The impedance element 60 is shown in FIG. 3 as a very small inductance.

The operation of the circuit of FIG. 3 may be described as follows. Assuming initially that SCR's 20 and 45 are not conducting, no voltage will appear across the output terminals 56 and 57. Also, capacitor 40 will be charged from the positive side of the voltage source 21 through resistor 41 and the delay network 55. The capacitor 40 will thus accumulate a voltage charge equal to the voltage of the voltage source 21. When it is desired to initiate a pulse, the switching circuit 39 is closed (manually or automatically), thereby coupling a switching pulse from the primary winding 29 to the secondary winding 35 of the transformer 36. The diode 30 then admits a gating current to the gate electrode 27 of the SCR 20, causing the latter to conduct current from the positive side of the voltage source 21, to the load 22 through terminal 56, then through terminal 57 to the negative side of the voltage source. As soon as the SCR 20 begins to conduct, terminal 56 will be raised to essentially the voltage of the positive side of the voltage source 21.

A discharge path will now be established for capacitor 40 through the SCR 20 and discharge resistor 41. As the capacitor 40 discharges, junction 42 experiences a rise in voltage. When the voltage at junction 42 reaches the predetermined voltage of the voltage-sensing device 46 (or the zener voltage of a zener diode 46), the device 46 will permit current to flow through resistor 50 to the gate electrode 48 of the SCR 45. Since the cathode of SCR 45 is connected to the negative side of the voltage source 21, the gating current flowing to the gate electrode 48 in combination with the forward bias provided by the voltage at junction 42 causes SCR 45 to switch to its high conducting state.

When SCR 45 is gated on, junction 42 experiences a sudden drop in voltage since it is effectively connected to the negative side of the voltage source 21 through a very low resistance path. This sudden drop in voltage at junction 42 is reflected in the anode electrode 25 of SCR 20 through the capacitor 40. The resulting voltage at the anode 25 is a negative transient voltage which drops the anode voltage of SCR 20. Since the SCR 20 is conducting, the cathode 26 attempts to follow the voltage at the anode 25; however, since the output terminal 56 is connected to a delay network 55 (or merely the load 22 if the latter is sufficiently reactive), the voltage at output terminals 56 and 57 cannot immediately follow the anode voltage 25. Accordingly, during the period of this negative transient, the voltage at terminal 56, and thus at the cathode 26, becomes positive with respect to the anode 25. Accordingly, the SCR 20 is momentarily reverse biased, thus causing the latter to turn off rapidly and permitting the voltage at output terminals 56 and 57 to return to zero. When SCR 20 is turned off, the voltage at junction 42 approaches the voltage of the negative side of the voltage source 21 to thereby cause SCR 45 to turn off, and the capacitor 40 begins to charge again through the resistor 41 and the delay network 55. The circuit has therefore returned to its initial state, and is now ready to be triggered again to produce another pulse.

Therefore, the circuit of FIGURE 3 may be triggered at any time, either manually or automatically, to produce a pulse of a given duration. The duration of the pulse may be adjusted by adjusting the RC time constant of the RC circuit 40—41 and/or by adjusting the voltage of conduction for the voltage-sensing device 46. For example, if a zener diode is utilized as the voltage-sensing device 46, the zener voltage may be chosen in accordance with the time required for junction 42 to reach that particular zener voltage.

The impedance device 60 may be placed between the positive side of the voltage source 21 and the anode electrode 25 of SCR 20 to partially isolate the voltage source from the negative voltage transient introduced at the anode 25 during the turn-off period. The impedance device 60 may become necessary if the voltage regulation characteristics of the voltage source 21 are such that the voltage source will rapidly respond to a negative transient to effectively reduce the magnitude of the transient. Further, delay network 55 may not be necessary if the load 22 is sufficiently reactive so that the voltage change across terminals 56 and 57 is sufficiently slow to permit the negative transient at the anode of SCR 20 to cause reverse biasing of the SCR during at least a portion of the transient time.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said resistance and capacitance, a zener diode connected between the anode and gate electrodes of said second silicon controlled rectifier and poled to permit zener current to flow from said anode electrode to said gate electrode, means connected to the gate electrode of said first silicon controlled rectifier for gating said first silicon controlled rectifier, and delay means connected between said output terminals for decreasing the rate of change of voltage at the output terminals.

2. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said resistance and capacitance, a zener diode connected between the anode and gate electrodes of said second silicon controlled rectifier and poled to permit zener current to flow from said anode electrode to said gate electrode, and means connected to the gate electrode of said first silicon controlled rectifier for gating said first silicon controlled rectifier.

3. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said resistance and capacitance, sensing means for sensing voltage at the anode of said second silicon controlled rectifier, said voltage-sensing means responsive to a predetermined voltage level for applying a gating current to the gate electrode of said second silicon controlled rectifier, and means connected to the gate electrode of said first silicon controlled rectifier for gating said first silicon controlled rectifier.

4. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said resistance and capacitance, sensing means for sensing voltage at the anode of said second silicon controlled rectifier, said voltage-sensing means responsive to a predetermined voltage level for applying a gating current to the gate electrode of said second silicon controlled rectifier, means connected to the gate electrode of said first silicon controlled rectifier for gating said first silicon controlled rectifier, and delay means connected between said output terminals for decreasing the rate of change of voltage at the output terminals 5. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a source of gating signals, a transformer having a primary winding and a secondary winding, means connecting said source of gating signals to the primary winding of said transformer, means connecting the secondary winding of said transformer between the cathode and gate electrodes of said first silicon controlled rectifier, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said resistance and capacitance, a zener diode connected between the anode and gate electrodes of said second silicon controlled rectifier and poled to permit zener current to flow from said anode electrode to said gate electrode, and delay means connected between said output terminals for decreasing the rate of change of voltage at the output terminals.

6. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a source of gating signals, a transformer having a primary winding and a secondary winding, means connecting said source of gating signals to the primary winding of said transformer, means connecting the secondary winding of said transformer between the cathode and gate electrodes of said first silicon controlled rectifier, a resistance and a capacitance connected in series between the anode and cathode electrodes of said first silicon controlled rectifier, said capacitance being connected to said anode electrode, a second silicon controlled rectifier having an anode, cathode, and gate electrode, means connecting the cathode electrode of said second silicon controlled rectifier to the first terminal of said voltage source, means connecting the anode electrode of said second silicon controlled rectifier to the junction of said resistance and capacitance, sensing means for sensing voltage at the anode of said second silicon controlled rectifier, said voltage sensing means responsive to a predetermined voltage level for applying a gating current to the gate electrode of said second silicon controlled rectifier, and delay means connected between said output terminals for decreasing the rate of change of voltage at the output terminals.

7. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a first resistance and a first capacitance connected in series between the anode and cathode electrodes of said first silicon controlled rectifier, said first capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said first resistance and first capacitance, a zener diode connected between the anode and gate electrodes of said second silicon controlled rectifier and poled to permit zener current to flow from said anode electrode to said gate electrode, means connected to the gate electrode of said first silicon controlled rectifier for gating said first silicon controlled rectifier, a second resistance and a second capacitance connected in parallel between said output terminals to form a delay circuit having a time constant RC larger than said first resistance and said first capacitance connected in series.

8. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a first resistance and a first capacitance connected in series beconnecting the cathode electrode of said second silicon controlled rectifier, said first capacitance being connected to said anode electrode, a second silicon controlled rectifier having anode, cathode, and gate electrodes, means connecting the cathode eletcrode of said second silicon controlled rectifier to the first terminal of said voltage source, means connecting the anode electrode of said second silicon controlled rectifier to the junction of said first resistance and first capacitance, sensing means for sensing voltage at the anode of said second silicon controlled rectifier, said voltage-sensing means responsive to a predetermined voltage level for applying a gating current to the gate electrode of said second silicon controlled rectifier, means connected to the gate electrode of said first silicon controlled rectifier for gating said first silicon controlled rectifier, a second resistance and a second capacitance connected in parallel between said output terminals to form a delay circuit having a time constant RC larger than said first resistance and first capacitance connected in series.

9. A pulse circuit comprising, a pair of output terminals, a voltage source having a first and a second terminal, means connecting the first terminal of said voltage source to one of said output terminals, a first silicon controlled rectifier having anode, cathode, and gate electrodes and having its anode electrode connected to the second terminal of said voltage source and its cathode electrode connected to the other of said output terminals, a source of gating signals, a transformer having a primary winding and a secondary winding, means connecting said source of gating signals to the primary winding of said transformer, means connecting the secondary winding of said transformer between the cathode and gate electrodes of said first silicon controlled rectifier, a first resistance and a first capacitance connected in series between the anode and cathode electrodes of said first silicon controlled rectifier, said first capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said first resistance and first capacitance, a zener diode connected between the anode and gate electrodes of said second silicon controlled rectifier and poled to permit zener current to flow from said anode electrode to said gate electrode, a second resistance and a second capacitance connected in parallel between said output terminals to form a delay circuit having a time constant RC larger than said first resistance and first capacitance connected in series.

10. A pulse circuit comprising, a pair of output terminals, a voltage source having a first and a second terminal, means connecting the first terminal of said voltage source to one of said output terminals, a first silicon contorlled rectifier having anode, cathode, and gate electrodes and having its first anode electrode connected to the second terminal of said voltage source and its cathode electrode connected to the other of said output terminals, a source of gating signals, a transformer having a primary winding and a secondary winding, means connecting said source of gating signals to the primary winding of said transformer, means connecting the secondary winding between the cathode and gate electrodes of said first silicon controlled rectifier, a first resistance and a first capacitance connected in series between the anode and cathode electrodes of said first silicon controlled rectifier, said first capacitance being connected to said anode electrode, a second silicon controlled rectifier having anode, cathode, and gate electrodes, means connecting the cathode electrode of said second silicon controlled rectifier to the first terminal of said voltage source, means connecting the anode electrode of said second silicon controlled rectifier to the junction of said first resistance and first capacitance, sensing means for sensing voltage at the anode of said second silicon controlled rectifier, said voltage-sensing means responsive to a predetermined voltage level for applying a gating current to the gate electrode of said second silicon controlled rectifier, a second resistance and a second capacitance connected in parallel between said output terminals to form a delay circuit having a time constant RC larger than said first resistance and said first capacitance connected in series.

11. In a pulse circuit having a first silicon controlled rectifier connected in series between a voltage source and a load, means for applying a reverse voltage to said first silicon controlled rectifier comprising, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the anode electrode of said second silicon controlled rectifier to the junction of said resistance and capacitance, means connecting the cathode electrode of said second silicon controlled rectifier to the junction of said voltage source and said load, sensing means for sensing voltage at the anode of said second silicon controlled rectifier, said voltage-sensing means responsive to a predetermined voltage level for applying a gating current to the gate electrode of said second silicon controlled rectifier.

12. In a pulse circuit having a first silicon controlled rectifier connected in series between a voltage source and a load, means for applying a reverse voltage to said first silicon controlled rectifier comprising, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the anode electrode of said second silicon controlled rectifier to the junction of said resistance and capacitance, means connecting the cathode electrode of said second silicon controlled rectifier to the junction of said voltage source and said load, and a zener diode connected between the anode and gate electrodes of said second silicon controlled rectifier and poled to permit zener current to flow from said anode electrode to said gate electrode.

13. In a pulse circuit having a first silicon controlled rectifier connected in series between a voltage source and a load, means for applying a reverse voltage to said first silicon controlled rectifier comprising, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the anode electrode of said second silicon controlled rectifier to the junction of said resistance and capacitance, means connecting the cathode electrode of said second silicon controlled rectifier to the junction of said voltage source and said load, sensing means for sensing voltage at the anode of said second silicon controlled rectifier, said voltage-sensing means responsive to a predetermined voltage level for applying a gating current to the gate electrode of said second silicon controlled rectifier, and delay means connected in parallel to said load for decreasing the rate of change of voltage across the load.

14. In a pulse circuit having a first silicon controlled rectifier connected in series between a voltage source and a load, means for applying a reverse voltage to said first silicon controlled rectifier comprising, a resistance and a capacitance connected in series between the anode and cathode electrodes of said first silicon controlled rectifier, said capacitance being connected to said anode electrode, a second silicon controlled rectifier having anode, cathode, and gate electrodes, means connecting the anode electrode of said second silicon controlled rectifier to the junction of said resistance and capacitance, means connecting the cathode electrode of said second silicon controlled rectifier to the junction of said voltage source and said load, a zener diode connected between the anode and gate electrodes of said second silicon controlled rectifier and poled to permit zener current to flow from said anode electrode to said gate electrode, and delay means connected in parallel to said load for decreasing the rate of change of voltage across the load.

15. In a pulse circuit having a first silicon controlled rectifier connected in series between a voltage source and a load, means for applying a reverse voltage to said first silicon controlled rectifier comprising, a first resistance and a first capacitance connected in series between the anode and cathode electrodes of said first silicon controlled rectifier, said first capacitance being connected to said anode electrode, a second silicon controlled rectifier having anode, cathode, and gate electrodes, means connecting the anode electrode of said second silicon controlled rectifier to the junction of said first resistance and first capacitance, means connecting the cathode electrode of said second silicon controlled rectifier to the junction of said voltage source and said load, sensing means for sensing voltage at the anode electrode of said second silicon controlled rectifier, said voltage sensing means responsive to a predetermined voltage level for applying a gating current to the gate electrode of said second silicon controlled rectifier, a second resistance and a second capacitance connected in parallel with each other and with said load to form a delay circuit having a time constant RC larger than said first resistance and said first capacitance connected in series.

16. In a pulse circuit having a first silicon controlled rectifier connected in series between a voltage source and a load, means for applying a reverse voltage to said first silicon controlled rectifier comprising a first resistance and a first capacitance connected in series between the anode and cathode electrodes of said first silicon controlled rectifier, said first capacitance being connected to said anode electrode, a second silicon controlled rectifier having anode, cathode, and gate electrodes, means connecting the anode electrode of said second silicon controlled rectifier to the junction of said first resistance and said first capacitance, means connecting the cathode electrode of said second silicon controlled rectifier to the junction of said voltage source and said load, a zener diode connected between the anode and gate electrodes of said second silicon controlled rectifier and poled to permit zener current to flow from said anode electrode to said gate electrode, a second resistance and a second capacitance connected in parallel with each other and in parallel with said load to form a delay circuit having a time constant RC larger than said first resistance and first capacitance connected in series.

References Cited in the file of this patent

UNITED STATES PATENTS

| | | |
|---|---|---|
| 2,776,400 | Crowther | Jan. 1, 1957 |
| 2,826,690 | Samuel | Mar. 11, 1958 |
| 3,045,148 | McNulty et al. | July 17, 1962 |
| 3,098,949 | Goldberg | July 23, 1963 |

FOREIGN PATENTS

| | | |
|---|---|---|
| 424,022 | Great Britain | Feb. 13, 1935 |

OTHER REFERENCES

"D.C. Power Supply Overload Protecting Using Silicon Controlled Rectifiers," Fung, Solid state/design, vol. 3, No. 6, June 1962, pages 51 and 52.

"Interval Timer for High Level Output," solid/state/design (application note), February 1962, page 42.

UNITED STATES PATENT OFFICE

CERTIFICATE OF CORRECTION

Patent No. 3,120,620 February 4, 1964

John R. Nowell

It is hereby certified that error appears in the above numbered patent requiring correction and that the said Letters Patent should read as corrected below.

Column 1, line 18, for "On" read -- One --; lines 24, 43 and 69, for "an", each occurrence, read -- a --; line 70, for "An" read -- A --; column 2, lines 16 and 43, for "an", each occurrence, read -- a --; column 7, lines 27 to 29, strike out "be- connecting the cathode electrode of said second silicon controlled rectifier," and insert instead -- between the anode and cathode electrodes of said first silicon controlled rectifier, --; line 32, for "eletcrode" read -- electrode --; column 8 lines 7 and 8, for "contorlled" read -- controlled --; column 10, line 13, after "comprising" insert a comma.

Signed and sealed this 7th day of July 1964.

(SEAL)
Attest:

ERNEST W. SWIDER EDWARD J. BRENNER

Attesting Officer Commissioner of Patents